United States Patent
Wada et al.

(10) Patent No.: US 7,277,366 B2
(45) Date of Patent: Oct. 2, 2007

(54) OPTICAL HEAD AND OPTICAL RECORDING AND REPRODUCING APPARATUS

(75) Inventors: Hidenori Wada, Kyoto (JP); Keiichi Matsuzaki, Osaka (JP); Hideki Hayashi, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 803 days.

(21) Appl. No.: 10/787,100

(22) Filed: Feb. 27, 2004

(65) Prior Publication Data

US 2004/0190400 A1    Sep. 30, 2004

(30) Foreign Application Priority Data

Feb. 28, 2003    (JP) .............................. 2003-052830

(51) Int. Cl.
  *G11B 7/00* (2006.01)
(52) U.S. Cl. .............................. 369/44.32; 369/53.14; 369/53.19
(58) Field of Classification Search ............. 369/44.32, 369/53.19, 53.14
  See application file for complete search history.

(56) References Cited

U.S. PATENT DOCUMENTS

| | | | |
|---|---|---|---|
| 5,835,463 A | | 11/1998 | Teshirogi et al. |
| 6,134,197 A | | 10/2000 | Ishibashi et al. |
| 6,212,143 B1 | | 4/2001 | Teshirogi et al. |
| 6,304,526 B1 | * | 10/2001 | Nagashima et al. ..... 369/44.23 |
| 6,330,213 B1 | | 12/2001 | Ishibashi et al. |
| 6,339,566 B1 | | 1/2002 | Kishimoto et al. |
| 6,490,100 B1 | | 12/2002 | Sasano et al. |
| 6,611,480 B2 | | 8/2003 | Ishibashi et al. |
| 6,807,017 B2 | * | 10/2004 | Sasano et al. .............. 359/719 |
| 2002/0071365 A1 | * | 6/2002 | Yanagawa ................ 369/53.19 |
| 2004/0070848 A1 | * | 4/2004 | Furuhata et al. ............ 359/804 |

FOREIGN PATENT DOCUMENTS

| | | |
|---|---|---|
| CN | 1327580 | 12/2001 |
| JP | 11-312327 | 11/1999 |
| JP | 2000-131603 | 5/2000 |
| JP | 2000-348362 | 12/2000 |
| JP | 2001-84631 | 3/2001 |

OTHER PUBLICATIONS

English Language Abstract of JP 11-312327.
English Language Abstract of JP 2000-131603.
English Language Abstract of JP 2000-348362.
English Language Abstract of JP 2001-84631.
English Language Abstract of WO 0113369, no date.

* cited by examiner

*Primary Examiner*—Wayne Young
*Assistant Examiner*—Lixi Chow
(74) *Attorney, Agent, or Firm*—Greenblum & Bernstein, P.L.C.

(57) ABSTRACT

An optical head performs recording and/or reproducing of a signal to an optical recording medium and comprises a light source, an objective lens converging the light emitted from the light source to the optical recording medium, and objective lens tilting mechanism for tilting the objective lens in order to correct aberration generated when the optical recording medium is tilted, and the optical head is assembled so that a direction of the coma aberration of the objective lens itself perpendicularly crosses a direction tilted by the objective lens tilting mechanism.

32 Claims, 7 Drawing Sheets

OPTICAL HEAD AND OPTICAL RECORDING AND REPRODUCING APPARATUS

BACKGROUND OF THE INVENTION

1. Field of the Invention

The present invention relates to an optical head used in optical information processing, optical communication or the like and an optical recording and reproducing apparatus using the optical head.

2. Description of the Related Art

Recently, a digital versatile disc (DVD) has attracted attention as a high-capacity optical recording medium because it can record digital information in a recording density which is about 6 times as high as a compact disc (CD). However, a further high-density optical recording medium is demanded as capacity of information becomes large. Here, in order to realize a density higher than the DVD (wavelength is 660 nm and numerical aperture (NA) is 0.6), it is necessary to use a light source emitting a light having shorter wavelength and to further increase the NA of the objective lens. For example, when blue laser having a wavelength of 405 nm and an objective lens having NA of 0.85 are used, a recording density which is 5 times as high as the DVD can be attained.

However, since the high-density optical recording medium apparatus using the blue laser has very strict reproducing and/or recording margin, in other words, a permissible level for a fluctuation of characteristic in reproducing or recording is limited very strictly, aberration generated when the optical recording medium is tilted becomes a problem. It is to be noted that the wording "reproducing and/or recording" means "at least one of reproducing and recording", in the specification, to simplify the description.

In relating to this problem, Japanese Patent Laid-open Publication No. 11-312327 discloses an optical head which can perform reproducing and recording operations by tilting an objective lens corresponding to the tilt of the optical recording medium to reduce the aberration.

One example of the above conventional optical head is described with reference to the drawing.

FIG. 7 is a schematic view showing a constitution of the conventional optical head. In FIG. 7, reference numeral 61 designates a light source, reference numeral 62 designates a collimator lens, reference numeral 63 designates a beam splitter, reference numeral 64 designates a raising mirror, reference numeral 65 designates an objective lens, reference numeral 66 designates an optical recording medium, reference numeral 67 designates a detection optical system, reference numeral 68 designates a lens holding member, reference numeral 69 designates a tilt sensor, reference numeral designates a focus error signal detection circuit, reference numeral 71 designates a tracking error signal detection circuit, reference numeral 72 designates a reproduction signal detection circuit, reference numeral 73 designates a tilt detection circuit, reference numeral 74 designates a controller, and reference numeral 75 designates a tilt control circuit.

The light source 61 is a semiconductor laser and it outputs recording and reproducing coherent light to a recording layer of the optical recording medium 66. The collimator lens 62 converts the light emitted from the light source 61 to parallel light, the beam splitter 63 is an optical element for isolating light, the raising mirror 64 is an optical element for reflecting the input light so as to orient it toward the optical recording medium, the objective lens 65 converges the light to the recording layer of the optical recording medium 66. The lens holding member 68 is to hold the objective lens 66 and capable of tilting the objective lens 66. And, the tilt sensor 69 is to detect the tilt of the optical recording medium 66.

Operation of the optical head constituted as described above is explained. The linear polarized light emitted from the light source 61 is converted to the parallel light by the collimator lens 62. The parallel light passes through the-beam splitter 63 and it is reflected by the raising mirror 64 and converged onto the optical recording medium 66 by the objective lens 65. Then, the reflected light from the optical recording medium 66 passes through the objective lens 65 and it is reflected by the mirror 64, reflected by the beam splitter 63 and led to the detection optical system 67. Here, a focus error signal, a tracking error signal and reproduction signal are detected. The focus error signal and the tracking error signal are detected by the well-known technique such as astigmatic method, a push-pull method or the like. If necessary, an offset is applied to the focus error signal and the tracking error signal by the controller 74. Focus controlling device (not shown) moves and controls the position of the objective lens 65 in the light-axis direction based on the focus error signal so that the light may be always converged onto the optical recording medium 66 in a focused state. In addition, tracking controlling device (not shown) moves and controls the position of the objective lens 65 based on the tracking error signal so that the light may be converged onto a desired track on the optical recording medium 66.

The tilt control of the objective lens 65 is performed based on a tilt signal detected by the tilt sensor 69 which detects the tilt of the optical recording medium 66 and the objective lens 65. The tilt sensor 69 is provided beside the objective lens 65. The tilt signal detected by the tilt sensor 69 is input to a tilt control circuit 75. And a signal for tilting the objective lens 65 is output from the tilt control circuit 75, the lens holding member 68 is controlled so as to eliminate the tilt of the objective lens 65 and the optical recording medium 66.

In such constitution, even when the optical recording medium 66 is tilted, the aberration can be reduced by detecting its tilt amount and tilting the objective lens 65, so that reproducing and/or recording operations can be stably performed.

However, according to the conventional optical head having the above constitution, when the objective lens itself has coma aberration, a tilt correcting function deteriorates in some cases. This is described in detail hereinafter. For example, it is assumed that recording and/or reproducing operations are performed on a optical recording medium having a substrate thickness of 0.1 mm with an optical head in which a wavelength of a light source is 405 nm and NA of an objective lens is 0.85. Here, since the optical recording medium is warped in the radial direction as is well known, it is assumed that only radial tilt correction is made. Since the objective lens has very large NA such as 0.85, coma aberration is considerably generated by tolerance (surfaces tilt, decenter of surface or the like) at the time of assembly. Thus, when the objective lens is mounted on the optical head and the optical head is assembled without considering the coma aberration owned by the objective lens itself, the direction of the coma aberration of the objective lens coincides with the radial direction in some cases, for example. When it is assumed that the coma aberration of the objective lens is 30 m$\lambda$ and the above optical head is assembled, the objective lens is tilted by 0.3 degree in the radial direction (that is, so as to be tilted along the radial direction) in order to eliminate the coma aberration of 30 mλ and mounted on the optical head. When the warp of the optical recording medium is corrected by the optical head assembled in such state, since the objective lens has been tilted in an initial state, it is effective for the warp in one direction but it is necessary to largely tilt the objective lens for the warp in the other direction. Therefore, aberration other than the coma aberration, such as a spherical aberration, is generated differently even when the warp amount is the same if the direction of the warp is different, whereby the tilt correcting function deteriorates.

SUMMARY OF THE INVENTION

The present invention was made in view of the above problems and it is an object of the present invention to provide an optical head in which a tilt correcting function does not deteriorate by assembling the optical head in consideration of aberration of an objective lens. In addition, it is a second object of the present invention to provide an optical recording and reproducing apparatus in which aberration caused by a warp of an optical recording medium can be corrected by using the above optical head and stable reproducing and/or recording operations can be performed.

In order to attain the above objects, an optical head according to the present invention performs recording and/or reproducing of a signal to an optical recording medium and includes a light source, an objective lens converging light emitted from the light source to the optical recording medium, and objective lens tilting mechanism for tilting the objective lens in order to correct aberration generated when the optical recording medium is tilted, and the optical head is assembled so that a direction of the coma aberration owned by the objective lens itself perpendicularly crosses a tilting direction by the objective lens tilting mechanism. Thus, a correcting function in which coma aberration generated when the optical recording medium is tilted is corrected by tilting the objective lens is improved, a stable control signal or a stable reproduction signal can be obtained and a stable recording operation can be performed In the above optical head, it is preferable that the objective lens tilting mechanism tilts the objective lens in the radial direction to correct aberration generated when the optical recording medium is tilted and the optical head is assembled so as to orient the direction of the coma aberration of the objective lens toward a tangential direction. Thus, a radial tilt correcting function (a tilt correcting function with respect to the radial direction) is improved In the above optical head, it is preferable that the objective lens tilting mechanism tilts the objective lens in a tangential direction to correct aberration generated when the optical recording medium is tilted and the optical head is assembled so as to orient the direction of the coma aberration of the objective lens toward a radial direction. Thus, a tangential tilt correcting function (a tilt correcting function with respect to the tangential direction) is improved.

In the above optical head, it is preferable that a mark designating the coma aberration is made on the objective lens. Thus, the objective lens can be easily mounted on the optical head so that direction of the coma aberration of the objective lens may be oriented toward a certain predetermined direction.

In the above optical head, it is preferable that the mark made on the objective lens is oriented toward the tangential direction. Thus, the objective lens can be easily mounted on the optical head so that direction of the coma aberration of the objective lens may be oriented toward the tangential direction and the radial tilt correcting function is further improved.

In the above optical head, it is preferable that the mark made on the objective lens is oriented toward the radial direction. Thus, the objective lens can be easily mounted on the optical head so that direction of the coma aberration of the objective lens may be oriented toward the radial direction and the tangential tilt correcting function is further improved.

In the above optical head, it is preferable that the mark designating the coma aberration of the objective lens is provided on a side surface of the objective lens. Thus, an objective lens surface after marked can be easily cleaned.

In the above optical head, it is preferable that the mark designating the coma aberration of the objective lens is provided outside an effective diameter on an upper surface of the objective lens. Thus, the objective lens can be easily mounted on the optical head so that direction of the coma aberration of the objective lens may be oriented toward a certain predetermined direction.

In the above optical head, it is preferable that the mark made on the objective lens designates a direction and an amount of the coma aberration. Thus, the objective lens can be further easily mounted on the optical head because even the tilt amount when mounted is known.

In the above optical head, it is preferable that the mark made on the objective lens is distinguished by using different colors and the amount of the coma aberration is designated by the kind of the color. Thus, since the degree of the coma aberration can be easily recognized and the objective lens can be easily mounted on the optical head.

In the above optical head, it is preferable that NA of the objective lens is 0.6 or more. Thus, the degree of tolerance for the tilt of the optical recording medium can be increased while a high density is implemented, in which an aberration margin for recording and reproducing operations is small. Therefore, it is suitable for further increasing the recording density.

In the above optical head, it is preferable that the optical head is further provided with tilt detecting device for detecting information referring to the tilt of the optical recording medium. In this case, the tilt detecting device detect information referring to the tilt of the optical recording medium, thereby the tilt amount of the optical recording medium can be easily detected.

In the above optical head, it is preferable that the tilt detecting device includes a light source, a lens converging the light emitted from the light source to the optical recording medium, and a light detector detecting the light reflected from the optical recording medium. Thus, since the aberration caused by the tilt of the optical recording medium is detected by another optical system, the aberration caused by the tilt of the optical recording medium can be detected simultaneously at the time of reproducing or recording operation.

In the above optical head, it is preferable that the tilt detecting device is detecting device for detecting a focus search voltage at any position of the objective lens and detecting the tilt of the optical recording medium based on the focus search voltage. In this case, the optical system for detecting the tilt is not separately provided, it is suitable for miniaturizing the optical head.

In the above optical head, it is preferable that the optical head further includes device for correcting aberration caused by a substrate thickness, which corrects aberration generated when the substrate thickness of the optical recording medium is shifted from a standard value. In this case, the device for correcting aberration caused by the substrate thickness corrects the aberration generated when the substrate thickness of the optical recording medium is shifted from the standard value. Thus, even when there are variations in substrate thickness of the optical recording medium having different thicknesses such as each recording layer of a multi-layer optical recording medium, different kinds of optical recording mediums, a single-layer optical recording medium or the like, a stable control signal and a stable reproduction signal can be obtained and a stable recording operation can be performed In the above optical head, it is preferable that the device for correcting the aberration caused by the substrate thickness further corrects spherical aberration generated when the objective lens is tilted. Thus, since the aberration can be further corrected, a stable control signal and a stable reproduction signal can be obtained and a stable recording operation can be performed.

In order to obtain the above objects, there is provided an optical recording and reproducing apparatus performing recording and reproducing of a signal to an optical recording medium, which includes the optical head performing recording and reproducing of the signal to the optical recording medium according to any one of claims 1 through 16. Thus, the aberration caused by the tilt of the optical recording medium can be precisely corrected, a stable control signal and a stable reproduction signal can be obtained and a stable recording operation can be performed.

DESCRIPTION OF THE PREFERRED EMBODIMENTS

Hereinafter, embodiments of the present invention are described with reference to the drawings.

Embodiment 1

According to an embodiment 1, an example of an optical head of the present invention is described.

Figure 1:
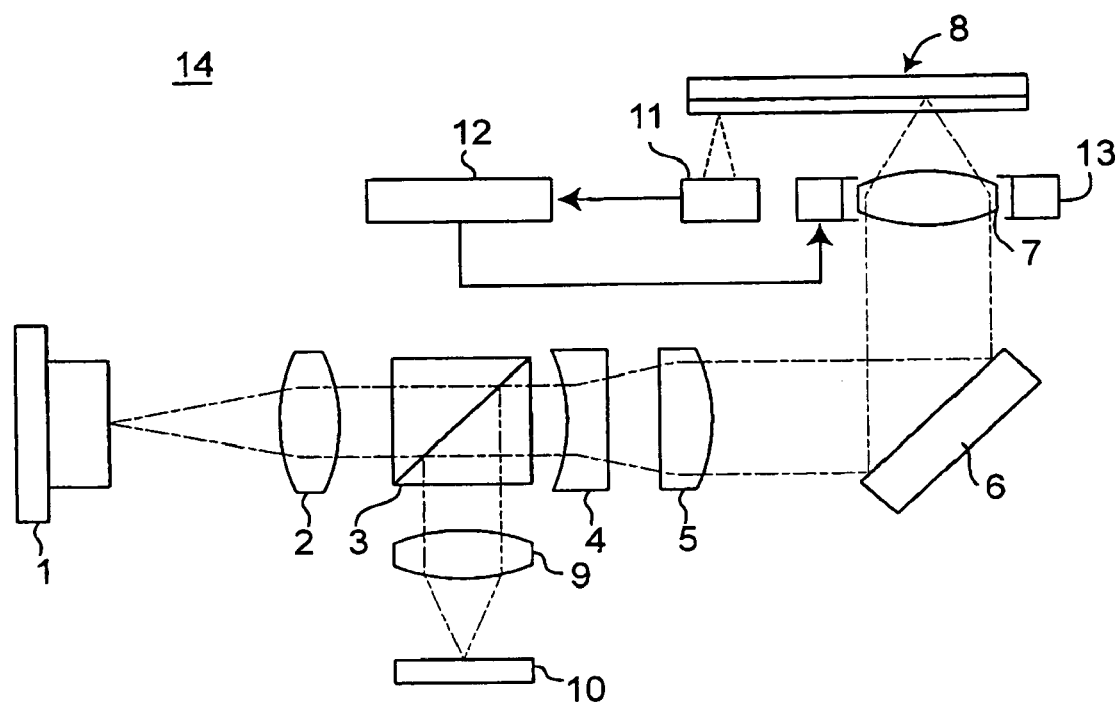
FIG. 1 is a schematic view showing an example of an optical head according to an embodiment 1 of the present invention.

FIG. 1 is a schematic view (a black diagram) showing an optical head 14 according to the embodiment 1.

Referring to FIG. 1, reference numeral 1 designates a light source, reference numeral 2 designates a collimator lens, reference numeral 3 designates a beam splitter, reference numeral 4 designates a concave lens, reference numeral 5 designates a convex lens, reference numeral 6 designates a mirror, reference numeral 7 designates an objective lens, reference numeral 8 designates an optical recording medium, reference numeral 9 designates a condenser lens, reference numeral 10 designates a light detector, reference numeral 11 designates a tilt sensor, reference numeral 12 designates a memory and reference numeral 13 designates objective lens tilting mechanism. The concave lens 4, the convex lens 5 and a lens position regulating device (not shown) for changing a distance between the above lens 4 and 5 constitute device for correcting aberration caused by a substrate thickness. The tilt sensor 11 constitutes tilt detecting device, the objective lens tilting mechanism 13 constitutes device for correcting aberration caused by a tilt, the concave lens 4 constitutes a negative lens group and the convex lens 5 constitutes a positive lens group.

Here, the light source 1 is constituted by a GaN-type semiconductor laser element (its wavelength is 405 nm), for example and outputs recording and reproducing coherent light to a recording layer of the optical recording medium 8. The collimator lens 2 converts the divergent light emitted from the light source 1 to parallel light. The beam splitter 3 is an optical element having a transmission factor of almost 50% and a reflection factor of almost 50%. The concave lens 4 converts the parallel light from the collimator lens 2 to divergent light and the convex lens 5 converts the divergent light from the concave lens 4 to parallel light. The mirror 6 is an optical element which reflects the input light toward the optical recording medium 8. The objective lens 7 converges the light to the recording layer of the optical recording medium 8. It is mounted to the optical head so that the direction of coma aberration of the objective lens 7 itself may be oriented toward the tangential direction of the disk-shape recording medium 8. In addition, its NA is 0.85. The condenser lens 9 converges the light reflected by the beam splitter 3 among the light reflected by the optical recording medium 8 to the light detector 10. The light detector 10 receives the light and converts it to an electrical signal corresponding to an amount of the light. The tilt sensor 11 detects an amount of tilt of the optical recording medium 8 in the radial direction, and an amount of tilt of the objective lens 7 corresponding to the amount of tilt when the optical recording medium 8 is tilted is stored in the memory 12.

Operations of the optical head constituted as described above are described with reference to FIG. 1. The linear polarized light emitted from the light source 1 is converted to the parallel light by the collimator lens 2. The light passed through the collimator lens 2 passes through the beam splitter 3 and the light is converted to the divergent light by the concave lens 4. Then, the light is converted to the parallel light by the convex lens 5, reflected by the mirror 6 so that the traveling direction thereof is changed by an angle of 90 degrees and converged onto the optical recording medium 8 by the objective lens 7.

Then, the reflected light from the optical recording medium 8 passes through the objective lens 7 and it is reflected by the mirror 6. Then, the light passes through the convex lens 5 and the concave lens 4 and it is reflected by the beam splitter 3 and converged to the light detector 10 by the condenser lens 9. The light detector 10 outputs a focus error signal which shows a focused state of the light on the optical recording medium 8 and outputs a tracking error signal which shows an irradiated position of the light. Here, the focus error signal and the tracking error signal are detected by the well-known technique such as an astigmatic method, a push-pull method and the like. The focus controlling device (not shown) controls the position of the objective lens 7 in its light-axis direction so that the light may be always converged on the optical recording medium 8 in the focused state based on the focus error signal. In addition, the tracking controlling device (not shown) controls the position of the objective lens 7 so that the light may be converged onto a desired track on the optical recording medium 8 based on the tracking error signal. Furthermore, the information recorded in the optical recording medium 8 is also obtained from the light detector 10.

Then, the tilt control of the objective lens 7 is described The tilt sensor 11 detecting the tilt of the optical recording medium 8 is provided beside the objective lens 7. The tilt sensor 11 detects the tilt of the optical recording medium 8 in the radial direction, and the detected signal is input to the memory 12. The memory 12 outputs a signal corresponding to the required tilt amount of the objective lens 7 depending on the tilt amount of the optical recording medium 8, and the objective lens tilting mechanism 13 tilts the objective lens 7 by a necessary amount according to this signal.

Then, a description is made of a fact that the objective lens 7 is mounted so that the direction of the coma aberration of the objective lens itself may be oriented toward the tangential direction, on the optical head which corrects coma aberration generated by the tilt of the optical recording medium 8 in the radial direction by tilting the objective lens 7 in the radial direction. Here, as an example of the objective lens 7, aspheric factors of first and second surfaces of the lens are shown in table 1. A surface configuration (sag) of the lens is represented by the following equation.

$$Z=(C \times r^2)/(1+(1-(1+k) \times C^2 \times r^2)^{1/2}) +a1 \times r^2+ a2 \times r^4+ \ldots +a8 \times r^{16}$$

C (1/R): Curvature
R: Curvature radius
k: Conic constant
r: Radius position
z: Sag
a1-a8: Aspheric factor (a1=0)

Figure 2:
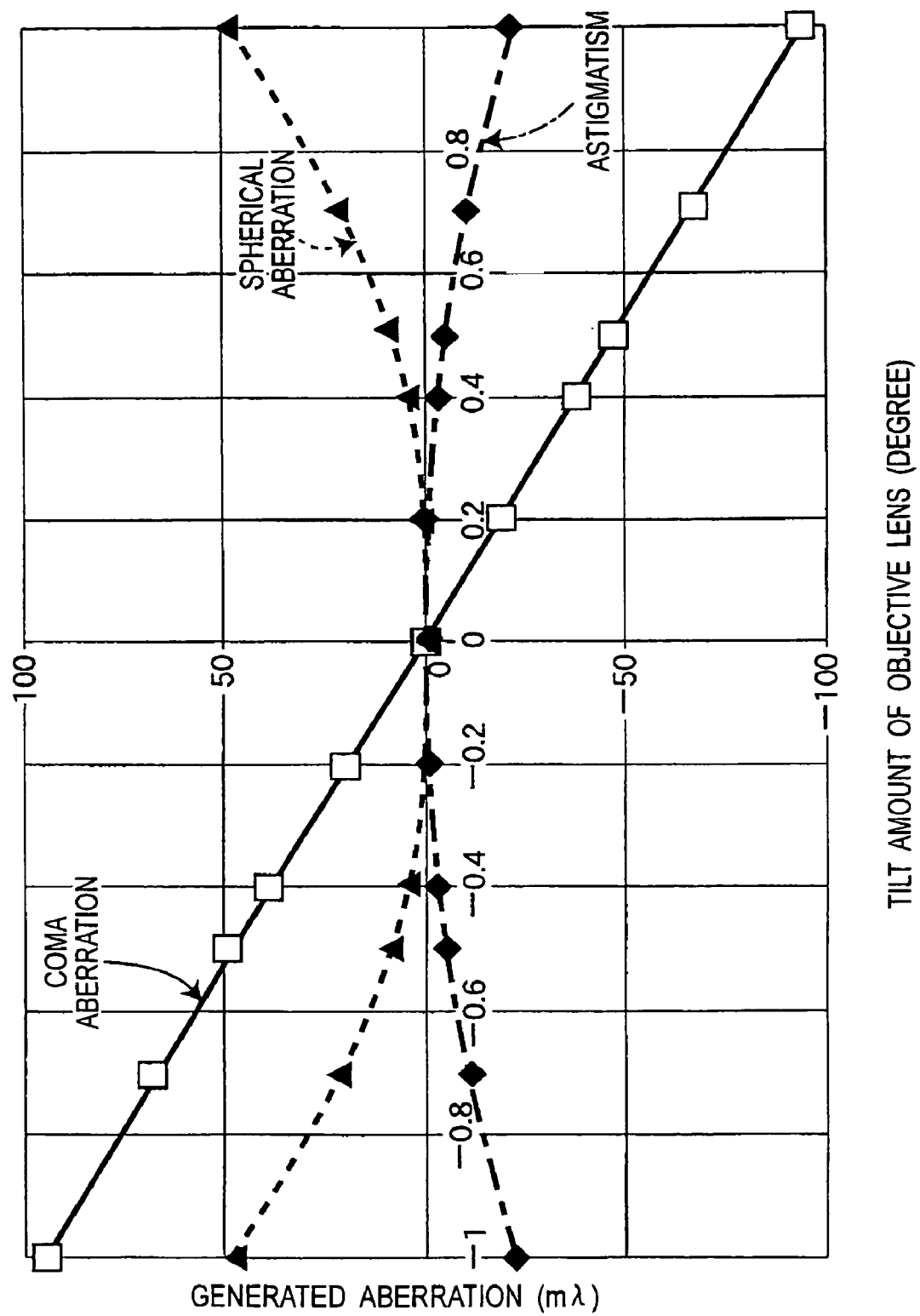
FIG. 2 is a graph showing an amount of each aberration generated in accordance with a tilt amount of an objective lens mounted on the optical head.

Since a value of NA is 0.85 which is very high, the coma aberration is considerably generated at surface tilt and decenter of the lens. In the case of lens shown in table 1, the coma aberration of 35 m$\lambda$ is generated at the surface tilt of 1 minute (1/60 degree) and the coma aberration of 35 m$\lambda$ is generated at the decenter of 5 $\mu$m. Thus, since very large coma aberration is generated when the lens is manufactured, it is necessary to correct the coma aberration when the optical head is assembled. In addition, FIG. 2 shows a result of calculation of coma aberration, astigmatism and spherical aberration when only the objective lens is tilted.

Thus, as the tilt amount of the objective lens 7 is increased, the coma aberration is increased, but the coma aberration generated when the optical recording medium is tilted is cancelled by the above coma aberration. In addition, when the objective lens 7 is tilted, astigmatism and spherical aberration are generated besides the coma aberration and this becomes aberration which remains after the coma aberration generated when the optical recording medium 8 are tilted was corrected by tilting the objective lens 7. Here, when it is assumed that the objective lens 7 has the coma aberration of 30 m$\lambda$ in itself (it is fully considered that the single lens is likely to have the coma aberration of 30 m$\lambda$ for example, the optical head is tilted by 0.3 degree when assembled in order to correct the coma aberration of 30 m$\lambda$ as shown in FIG. 2. When the direction of the coma aberration of 30 m$\lambda$ is the radial direction, the objective lens is tilted by 0.3 degree in the radial direction when mounted. Here, when the coma aberration (70 m$\lambda$) generated when the optical recording medium is tilted by 0.7 degree is corrected in the optical head assembled as described above, for example, the objective lens is tilted by 0.7 degree as shown in FIG. 2, but the objective lens 7 itself result in being tilted by 1.0 degree and the astigmatism of 20 m$\lambda$ is generated and the spherical aberration of 50 m$\lambda$ is generated. In addition, when the coma aberration (−70 m$\lambda$) generated when the optical recording medium is tilted by −0.7 degree is corrected, for example, the objective lens is tilted by −0.7 degree as shown in FIG. 2, but the objective lens itself results in being tilted by −0.4 degree and the astigmatism of 5 mm$\lambda$ is generated and the spherical aberration of 5 m$\lambda$ is generated.

Thus, since the objective lens 7 is tilted and mounted when the optical head is assembled in order to correct the coma aberration of the objective lens 7 itself, even when the tilted amount of the optical recording medium 8 is the same, the amounts of aberration other than the coma aberration are different depending on its direction. In other words, the aberration other than the coma aberration is asymmetrically generated with respect to the tilt of the optical recording medium 8. In this case, since the tilt correcting amount of the optical recording medium 8 is substantially reduced, it

TABLE 1

|  | R | K | a1 | a2 | a3 |
|---|---|---|---|---|---|
| First surface | 1.751E+00 | −7.657E−01 | 0.000E+00 | 9.147E−03 | 7.880E−04 |
| Second surface | −2.543E+00 | −1.730E+02 | 0.000E+00 | 2.228E−01 | −5.943E−01 |

|  | a4 | a5 | a6 | a7 | a8 |
|---|---|---|---|---|---|
| First surface | 2.390E−04 | −4.984E−05 | −1.600E−05 | 1.931E−05 | −5.677E−06 |
| Second surface | −5.448E−01 | 2.649E+00 | 6.373E+00 | −2.937E+01 | 2.734E+01 | means that a correcting function deteriorates. Thus, when the direction of the coma aberration of the objective lens 7 is set in the tangential direction of the optical recording medium 8, since the objective lens is tilted in the tangential direction as described above and mounted on the optical head, the substantial tilting amount of the objective lens 7 for correcting the tilt of the optical recording medium 8 is the same without depending on the tilting direction of the optical recording medium 8 and the amount of the aberration other than the coma aberration is generated symmetrically with respect to the tilt of the optical recording medium 8, so that the radial tilt correction has a preferable function.

Next, a description is made of a method of orienting the direction of the coma aberration of the objective lens 7 toward the tangential direction. The aberration of the objective lens 7 has been previously measured and a mark is made in the direction of the coma aberration. This mark is oriented toward the tangential direction when mounted on an actuator.

Figure 3A:
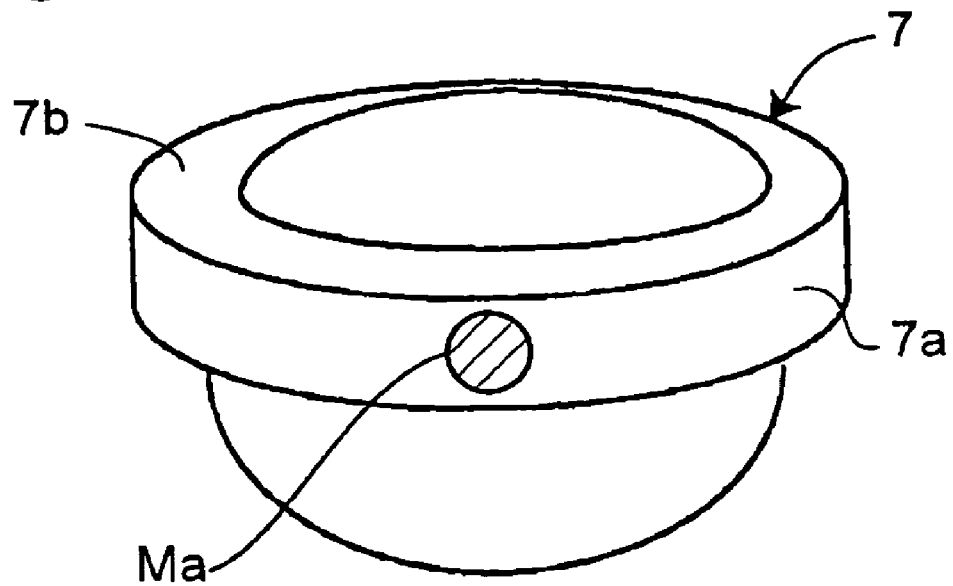
FIGS. 3A and 3B are explanatory drawings showing mounted positions of marks designating coma aberration in the optical head.
Figure 3B:
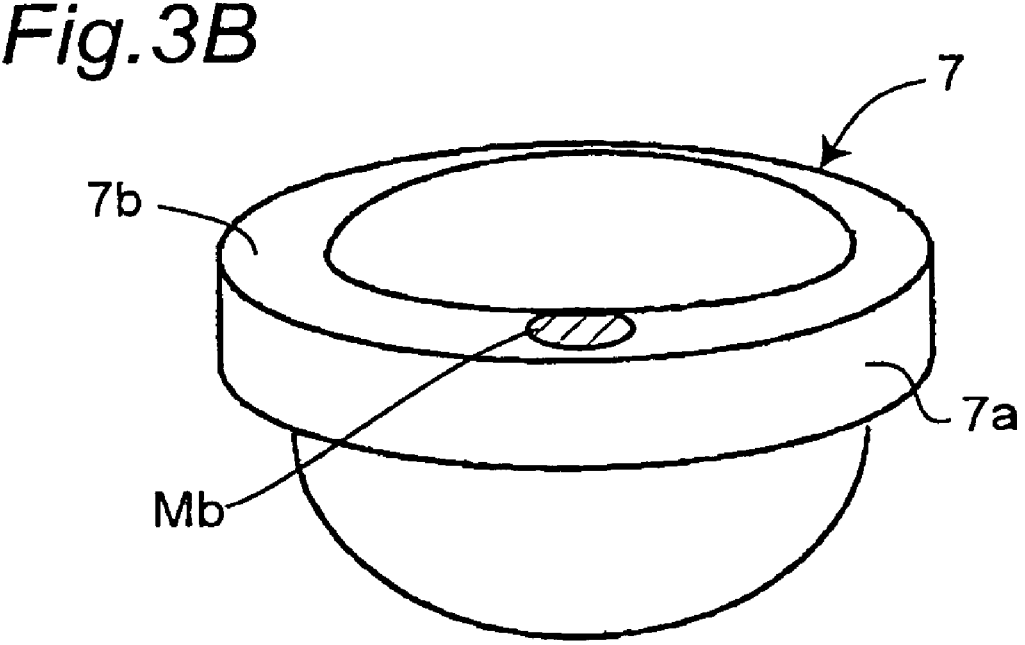

Here, this mark is to be made on a side surface 7a (FIG. 3(*a*)) of the objective lens 7 or on an upper surface region 7b (FIG. 3(*b*)) through which light does not pass. According to an advantage when the mark Ma is made on the side surface 7a, after it is mounted on the actuator, when the lens is wiped by a cloth containing organic solvent such as ethanol to wipe out a stain on the surface of the objective lens 7, if there is a mark formed by ink or the like on the upper surface 7b, it is melted by the organic solvent and stains the lens surface in reverse. Thus, when the mark Ma is made on the side surface 7a, the objective lens 7 can be easily cleaned after mounted on the actuator. Next, a description is made of an advantage when the mark Mb is made on the upper surface 7b. When the mark Mb is made on the upper surface 7b, since the direction of the coma aberration of the objective lens 7 is always seen, it is easy to mount it on the actuator in the tangential direction.

Figure 4:
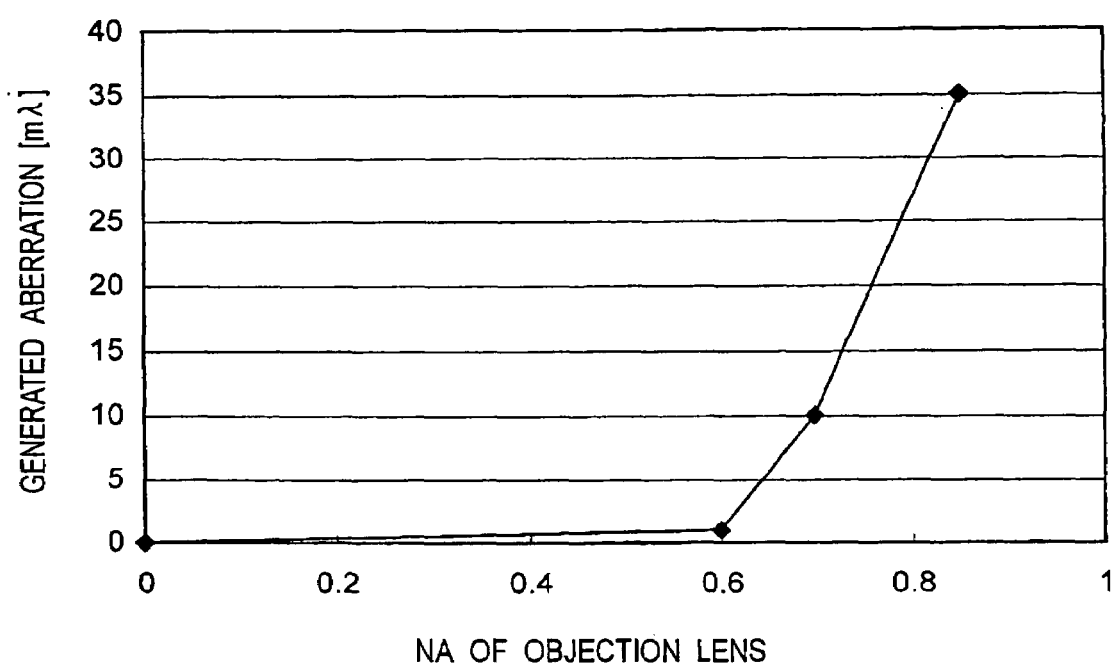
FIG. 4 is a graph showing a relationship between NA of the objective lens and amount of aberration.

Furthermore, the present invention is more advantageous when the NA of the objective lens 7 is 0.6 or more. This fact will be explained in detail. Actually, the allowance for aberration in manufacturing lens 7 becomes strict according to the NA of the objective lens 7. In forming the objective lens 7, at least 5 μm of decenter between a first surface and a second surface of the objective lens 7 is generated. FIG. 4 is a graph showing a relationship between the NA of the objective lens 7 and amount of generated coma aberration when 5 μm of decenter between a first surface and a second surface of the objective lens 7 is generated. As is well known from FIG. 4, when the NA becomes greater than 0.6, a coma aberration by the decenter is generated. Furthermore, in considering the other tolerance, in the case of the objective lens 7 having the NA greater than 0.6, considerable coma aberration is generated by the tolerance in manufacturing. Thus, in the case of the objective lens 7 having the NA greater than 0.6, the lens is frequently tilted at the initial condition when the optical head is assembled. Therefore, the present invention is more advantageous when the NA of the objective lens 7 is 0.6 or more.

According to this embodiment, the tilt amount of the objective lens 7 required for correcting the tilt of the optical recording medium is stored in the memory 12 for each layer (for a single-layer optical recording medium and each layer of a multi-layer optical recording medium).

Then, a description is made of device for correcting aberration caused by a substrate thickness (the concave lens 4, the convex lens 5 and the lens position regulating mechanism (not shown) for changing a distance between the above lens 4 and 5). When the optical recording medium 8 has density higher than the above-described DVD, since the spherical aberration of 200 mλ is generated in the substrate thickness of 0.08 mm, recording and/or reproducing operations cannot be performed. Thus, it is necessary to correct the spherical aberration. Japanese Patent Laid-open Publication No. 2000-131603 discloses a method in which two lenses (a positive lens group and a negative lens group) are inserted in parallel light and a distance between lenses is changed in the light-axis direction, and converting the parallel light to divergent light or converged light, for example, thereby the spherical aberration is corrected.

This method is described in detail. When the distance between the negative lens group and the positive lens group is reduced, the parallel light is converted to the divergent light and when the distance is increased, the parallel light is converted to the converged light. In other words, the light having power components in which signs are different can be generated by changing the distance between the negative lens group and the positive lens group. Here, when the light having the power component is input to the objective lens, the spherical aberration is generated in the light focused by the objective lens. Since its sign depends on the sign of the input power component, the spherical aberration generated when the substrate thickness of the optical recording medium is shifted from an optimal substrate thickness can be corrected by using the above spherical aberration.

According to this embodiment, the correction is made by changing the distance between the concave lens 4 and the convex lens 5 for each layer. In addition, since the distance between the concave lens 4 and the convex lens 5 for each layer is stored in the memory 12, when recording and reproducing operations are performed on a certain layer, the concave lens 4 or the convex lens 5 is moved so that the distance between them may be the distance stored in the memory 12.

Here, since the spherical aberration is generated when the objective lens is tilted, this spherical aberration can be corrected also by using the device for correcting aberration caused by the substrate thickness. In this case, the amount of the spherical aberration generated according to the tilt amount of the objective lens is to be previously detected and stored in the memory so that the spherical aberration generated according to the tilt amount of the objective lens can be corrected.

Next, a description is made of a tilt sensor 11 which detects the tilt of the optical recording medium 8. The tilt sensor 11 includes a light source (not shown) provided besides the light source 1 such as LED or the like, a lens, and a light detector (not shown) provided besides the light detector 10. Since the operation of the tilt sensor is well known, it is not described in detail but described briefly. The light emitted from the light source such as the LED or the like is converged to the optical recording medium by the lens and reflected light from the optical recording medium 8 is received by the light detector. For example, the light detector has a light receiving part divided into two and a signal of the difference between them is set to be zero when the optical recording medium 8 is not tilted. When the optical recording medium 8 is tilted, since the signal of the difference between light receiving parts is not zero, according to the value and the sign, it can be detected how much and in which direction the optical recording medium 8 is tilted.

Figure 5:
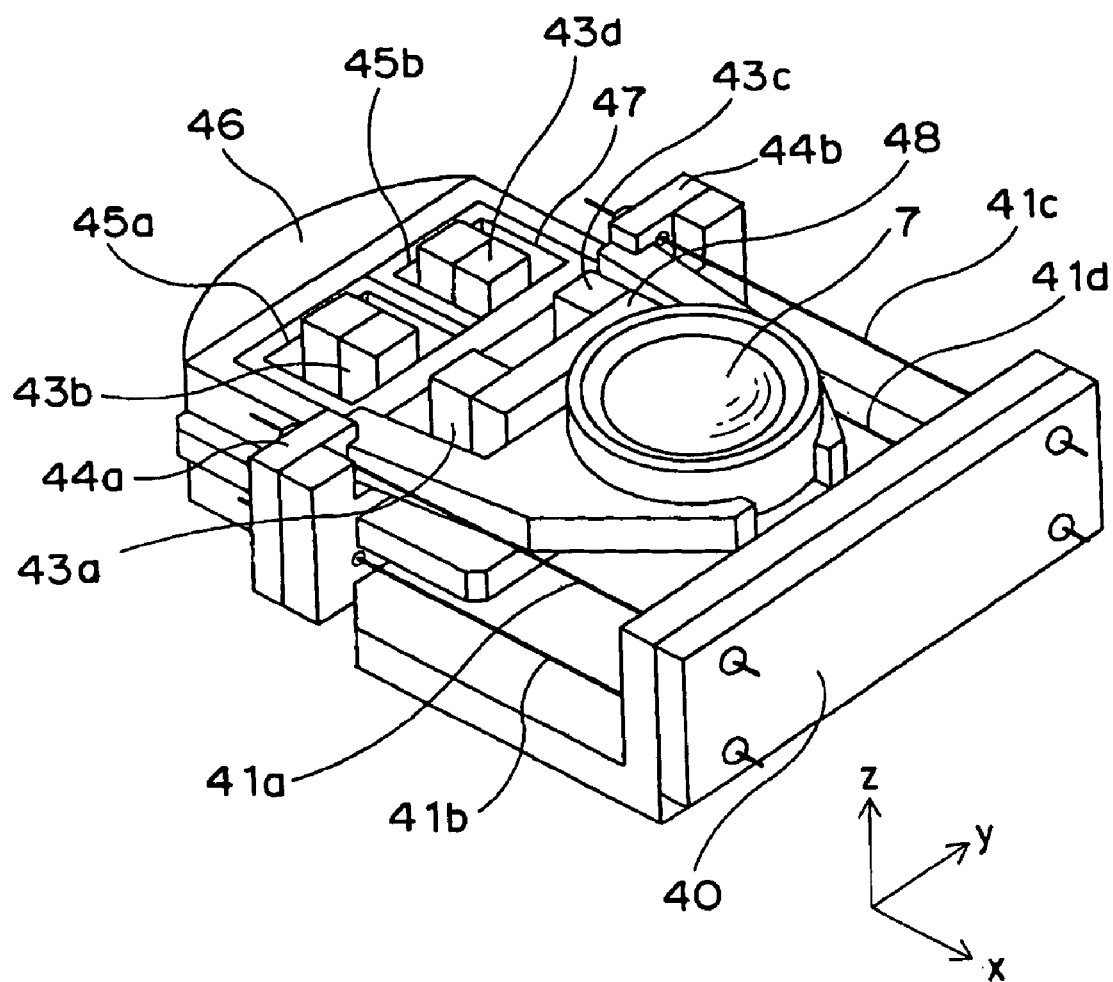
FIG. 5 is a schematic view showing an example of device for correcting aberration caused by a tilt, used in the optical head.

Next, the objective lens tilting mechanism is described. FIG. 5 shows an example of the objective lens tilting mechanism.

Such a objective lens tilting mechanism is same as conventionally known one, and has similar construction as disclosed in Japanese Patent Laid-open Publication No. 11-312327 for example. In FIG. 5, reference numeral 40 designates a suspension mounting substrate, reference numerals 41a to 41d designate suspensions, reference numerals 43a to 43d designate magnets, reference numerals 44a and 44b designate small substrates, reference numerals 45a and 45b designate focus coils, reference numeral 46 designates a lens holding member, reference numeral 47 designates a tracking coil, reference numeral 48 designates a yoke, and reference numeral 7 is the objective lens described in FIG. 1. The z-axis direction is the focusing direction, the y-axis direction is the tracking direction, and the x-axis direction is the tangential direction. The objective lens 7 is mounted in such as manner that the mark designating the coma aberration of the objective lens 7 may be oriented toward the tangential direction (x-axis direction). The operation of the objective lens tilting mechanism constituted as described above will be generally explained. It is to be noted that the details of such an operation is basically same as that disclosed in Japanese Patent Laid-open Publication No. 11-312327. When a current is applied to the focus coils 45*a* and 45*b*, focus coil driving force is generated together with magnetic flux generated by the magnets 43*a* to 43*d* (Fleming's law), so that the objective lens 49 can be tilted. The tilting direction and amount can be varied by varying the current flowing to the focus coils 45*a* and 45*b*.

As described above, the radial tilt correcting function can be symmetrical by assembling the optical head so that the direction of the coma aberration of the objective lens 7 may be oriented toward the tangential direction of the optical recording medium 8. As a result, the radial tilt correcting function of the optical head can be superior and stable recording and/or reproducing operations can be performed.

At this time, although the objective lens 7 is tilted according to the amount of the coma aberration of the objective lens itself in the tangential direction, since it is supposed that a warp generated in the optical recording medium 8 hangs down from the center toward an outer periphery in the shape of an umbrella in general, in this case, the tilt in the tangential direction is hardly generated and even when it is generated, it is negligible, so that there is no problem.

In addition, although the tilt detecting device is provided by the tilt sensor 11, there is no problem even when another method is employed For example, another tilt detecting device is disclosed in Japanese Patent Laid-open Publication No. 2000-348362. Although it is not described in detail, in this known tilt detecting device, an objective lens is moved at an inner periphery and an outer periphery of an optical recording medium in the light-axis direction, a focus zero cross position in which most preferable focus is adjusted is detected. And the tilt amount and direction of the optical recording medium is determined based on a difference between the inner periphery and the outer periphery of a focus search voltage for detecting the above position. According to this constitution, since the optical system for detecting the tilt is not separately provided, it is suitable for miniaturizing the optical head. On the other hand, according to the above method of this embodiment, since another optical system is used, the tilt can be simultaneously detected at the time of recording or reproducing operations.

Furthermore, although the single concave lens 4 and the single convex lens 5 are used as the device for correcting the aberration caused by the substrate thickness according to the embodiment 1, a positive lens group may be used instead of the single concave lens 4 and a negative lens group can be used instead of the single convex lens 5 or another method can be employed. For example, as shown in Japanese Patent Laid-open Publication No. 2001-84631, a liquid crystal can be used instead of the concave lens 4 and the convex lens 5. Although it is not described in detail in this known constitution, phase distribution of the spherical aberration itself can be provided to the transmitted light because refraction factor of the liquid crystal varies from place to place, and this provided spherical aberration corrects spherical aberration generated when the thickness of the optical recording medium is shifted from a standard value. In this case, a voltage amount to be applied to the liquid crystal, which is required for correcting the spherical aberration corresponding to each layer is stored in the memory 12.

According to the above method of this embodiment, since the device for correcting the aberration caused by the substrate thickness includes the lens, the aberration caused by the substrate thickness of the optical recording medium can be corrected in both outgoing and returning light, a stable control signal can be obtained. In addition, according to the above-described method, since the aberration caused by the substrate thickness of the optical recording medium is corrected by the optical element using the phase variation layer, it is suitable for miniaturizing the optical head.

In addition, although the coma aberration generated when the optical recording medium 8 is tilted is corrected by tilting the objective lens 7 so that the coma aberration may become the minimum in this embodiment, since the aberration (astigmatism or high order aberration) is generated other than the coma aberration when the objective lens 7 is tilted, the method may be a method of minimizing the total aberration. In this case also, when the tilt of the objective lens 7 at the time of being mounted is made to cross the tilt of the optical recording medium 8 perpendicularly, since the aberration is generated symmetrically regardless of the tilting direction of the optical recording medium 8, aberration generated when the optical recording medium 8 is tilted can be corrected more effectively.

Furthermore, although the single lens is used as the objective lens in this embodiment, there is no problem even when a combined lens having high NA is used.

In addition, although the infinite type of optical head is shown in this embodiment, a finite type of optical head which does not use the collimator lens may be employed.

Still further, although the no-polarization optical system of optical head is shown in this embodiment, polarization optical system of optical head may be employed.

Still further, regarding the direction of the tilt controlling device in this embodiment, the tilting direction of the objective lens is oriented toward the radial direction, but in a case where it is tilted in the tangential direction, it is not necessary to say that the same effect can be obtained when the direction of the coma aberration of the objective lens is made to be oriented toward the radial direction.

In addition, since the aberration of the objective lens 7 has been previously measured in order to make a mark designating the direction of the coma aberration and its amount has been known, when the mark is made by changing a color of the mark in increments of 10 m$\lambda$ for example, the direction and amount of tilting can be known, so that the objective lens 7 can be easily mounted on the optical head.

Still further, according to the above method of this embodiment, the device for correcting the aberration caused by the substrate thickness is constituted by a concave lens 4, a convex lens 5 and a lens position regulating device (not shown) for changing a distance between the above lens 4 and 5. However, even if it does not include a concave lens 4 and a convex lens 5, it is possible to constitute the device for correcting the aberration caused by the substrate thickness only by changing the position of the collimator lens 2.

Embodiment 2

An example of a light recording and reproducing apparatus using the optical head according to the embodiment 1 is described in an embodiment 2. The recording and reproducing apparatus according to the embodiment 2 performs recording and/or reproducing of the signal to an optical recording medium.

Figure 6:
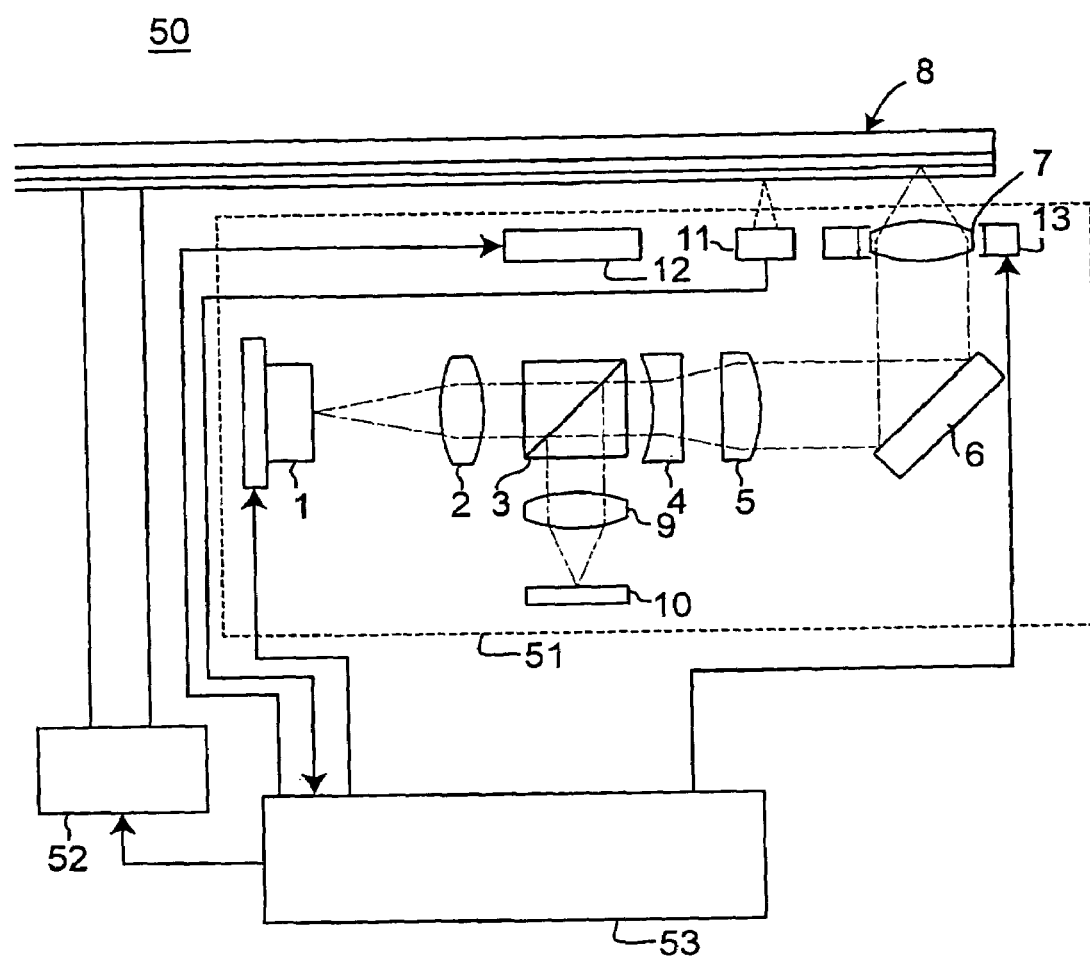
FIG. 6 is a schematic view showing an example of an optical recording and reproducing apparatus according to an embodiment 2 of the present invention.
Figure 7:
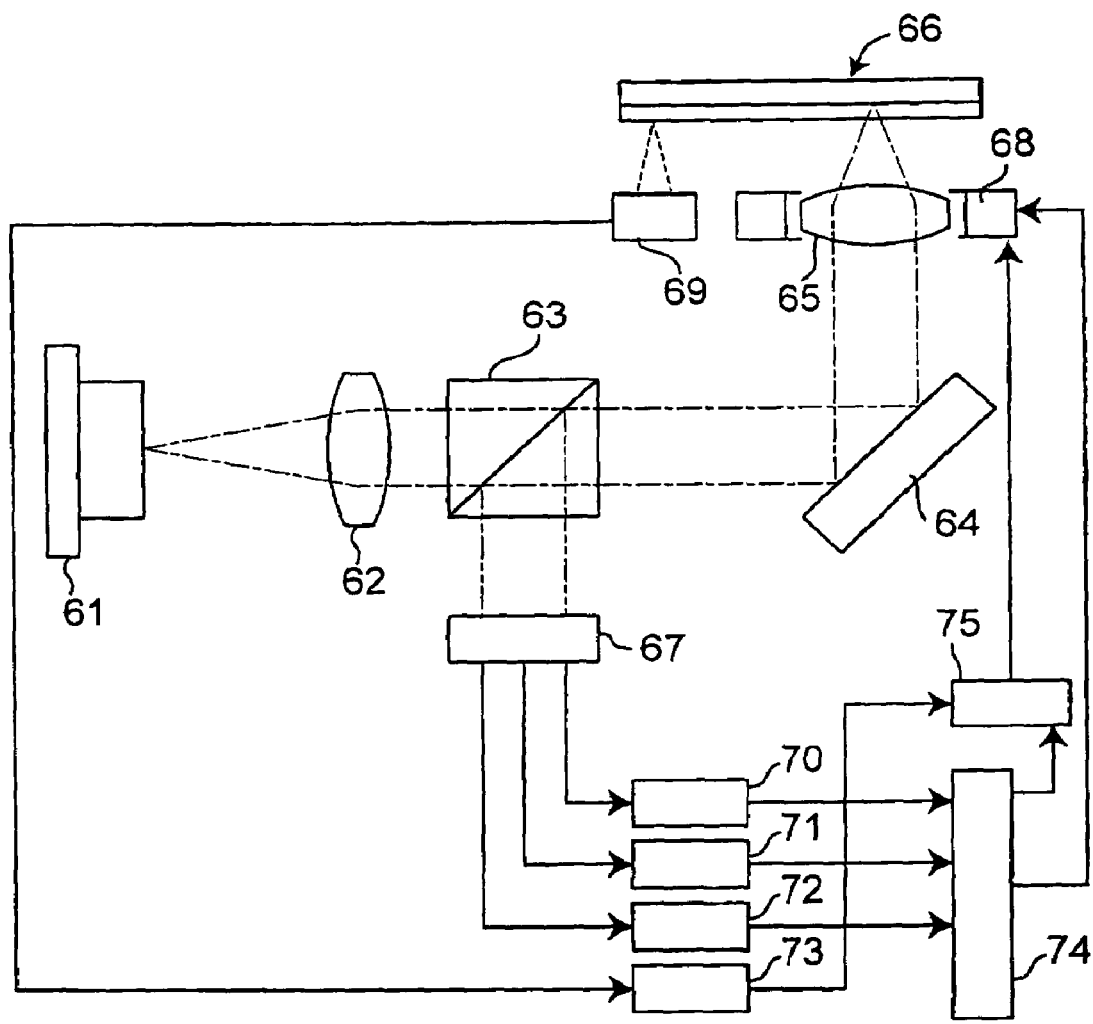
FIG. 7 is a schematic view showing an example of the conventional optical head

FIG. 6 schematically shows a constitution of a light recording and reproducing apparatus 50 according to the embodiment 2. The light recording and reproducing apparatus 50 includes an optical head 51, a motor 52 and a processing circuit 53. The optical head 51 is the one described in the embodiment 1.

Since the optical head 51 is the same as described in the embodiment 1, its duplicated explanation is omitted.

Then, the operation of the light recording and reproducing apparatus 50 is described. First, when an optical recording medium 8 is set in the light recording and reproducing apparatus 50, the processing circuit 53 outputs a signal which rotates the motor 52 to rotate the motor 52. Then, the processing circuit 53 drives the light source 1 to emit light. The light emitted from the light source 1 is reflected by the optical recording medium 8 and input into the light detector 10. The light detector 10 outputs a focus error signal designating a focused state of the light on the optical recording medium 8 and a tracking error signal designating an irradiated position of the light to the processing circuit 53. Based on these signals, the processing circuit 53 outputs the signal for controlling the objective lens 7, whereby the light emitted from the light source 1 is converged to a desired track on the optical recording medium 8. Furthermore, the processing circuit 53 reproduces information recorded on the optical recording medium 8 based on the signal output from the light detector 10. In addition, the tilt sensor 11 detects an amount of tilt of the optical recording medium 8 and the detected signal is input to the processing circuit 53. The processing circuit 53 searches the memory 12 for the tilt amount of the objective lens 7 which is required for correcting the tilt amount of the optical recording medium and outputs a signal for tilting the required amount to objective lens tilting mechanism 13 so that the objective lens tilting mechanism 13 tilts the objective lens in the radial direction by the required amount.

As described above, since the optical head according to the embodiment 1 is employed as the optical head, the aberration generated when the optical recording medium is tilted can be precisely corrected Furthermore, when the tilting amount is the same, since the aberration after corrected is constant regardless of the direction, the tilt correcting function becomes preferable, a stable control signal and a stable reproduction signal can be obtained, and a stable recording and/or reproducing operation can be performed.

Although the embodiments of the present invention are illustrated and described, the present invention is not limited to those and it can be applied to another embodiment on a basis of technical thought of the present invention.

In addition, although the optical recording medium recording the information by only light is described in the above embodiments, it is needless to say that the same effect can be obtained in the optical recording medium recording information by light and a magnet.

Still further, although the description is made of the case where the optical recording medium is the optical disc in the above embodiments, the present invention can be applied to an optical information recording and reproducing apparatus which implements the similar function, such as a card-shaped optical recording medium.

As described above, according to the present invention, the direction of the coma aberration of the objective lens itself is oriented so as to perpendicularly cross the direction in which the coma aberration generated when the optical recording medium is tilted is corrected by tilting the objective lens. Thereby, in correcting the coma aberration generated when the optical recording medium is tilted by tilting the objective lens, the aberration generated other than the coma aberration can be generated symmetrically with respect to the tilt of the optical recording medium Therefore, the correction effect can become preferable. Furthermore, when the mark designating the direction of the coma aberration further designates the amount thereof, the optical head can be very easily assembled.

Still further, since the light information recording and reproducing apparatus is constituted by the optical head, even when the optical recording medium is tilted, the stable control signal and the stable reproducing signal can be obtained, whereby the optical recording and reproducing apparatus enabling the stable recording and/or reproducing operation can be implemented.

It is to be noted that the present invention is not limited by the above described embodiments. Various alternation and improvement may be made without departure from the spirit of the invention.

The present disclosure relates to subject matter contained in Japanese Patent Application No. 2003-052830, filed on Feb. 28, 2003, the contents of which are herein expressly incorporated by reference in its entirety.

What is claimed is:

1. An optical head performing recording and/or reproducing of a signal to an optical recording medium, comprising:
a light source;
an objective lens converging the light emitted from the light source to the optical recording medium; and
objective lens tilting mechanism for tilting the objective lens in order to correct aberration generated when the optical recording medium is tilted,
wherein the optical head is assembled so that a direction of the coma aberration of the objective lens itself perpendicularly crosses a direction tilted by the objective lens tilting mechanism.

2. The optical head according to claim 1, wherein the objective lens tilting mechanism tilts the objective lens in the radial direction to correct aberration generated when the optical recording medium is tilted and the optical head is assembled so as to orient the direction of the coma aberration of the objective lens toward a tangential direction.

3. The optical head according to claim 1, wherein the objective lens tilting mechanism tilts the objective lens in a tangential direction to correct aberration generated when the optical recording medium is tilted and the optical head is assembled so as to orient the direction of the coma aberration of the objective lens toward a radial direction.

4. The optical head according to claim 1, wherein a mark designating the coma aberration is made on the objective lens.

5. The optical head according to claim 4, wherein the mark made on the objective lens is oriented toward a tangential direction.

6. The optical head according to claim 4, wherein the mark made on the objective lens is oriented toward a radial direction.

7. The optical head according to claim 4, wherein the mark designating the coma aberration of the objective lens is provided on a side surface of the objective lens.

8. The optical head according to claim 4, wherein the mark designating the coma aberration of the objective lens is provided outside an effective diameter on an upper surface of the objective lens.

9. The optical head according to claim 1, wherein the mark made on the objective lens designates a direction and an amount of the coma aberration.

10. The optical head according to claim 9, wherein the mark made on the objective lens is distinguished by using different colors and the amount of the coma aberration is designated by the kind of the color.

11. The optical head according to claim 1, wherein NA of the objective lens is 0.6 or more.

12. The optical head according to claim 1, further comprising tilt detecting device for detecting information referring to the tilt of the optical recording medium.

13. The optical head according to claim 12, wherein the tilt detecting device comprises:
  a light source;
  a lens converging the light emitted from the light source to the optical recording medium; and
  a light detector detecting the light reflected from the optical recording medium.

14. The optical head according to claim 12, wherein the tilt detecting device is a device for detecting a focus search voltage at any position of the objective lens and detecting the tilt of the optical recording medium based on the focus search voltage.

15. The optical head according to claim 1, further comprising device for correcting aberration caused by a substrate thickness, which corrects aberration generated when the substrate thickness of the optical recording medium is shifted from a standard value, wherein the device for correcting aberration caused by the substrate thickness corrects the aberration generated when the substrate thickness of the optical recording medium is shifted from the standard value.

16. The optical head according to claim 15, wherein the device for correcting the aberration caused by the substrate thickness further corrects spherical aberration generated when the objective lens is tilted.

17. An optical recording and reproducing apparatus performing recording and/or reproducing of a signal to an optical recording medium, comprising the optical head performing recording and/or reproducing of the signal to the optical recording medium according to claim 1.

18. An optical recording and reproducing apparatus performing recording and/or reproducing of a signal to an optical recording medium, comprising the optical head performing recording and/or reproducing of the signal to the optical recording medium according to claim 2.

19. An optical recording and reproducing apparatus performing recording and/or reproducing of a signal to an optical recording medium, comprising the optical head performing recording and/or reproducing of the signal to the optical recording medium according to claim 3.

20. An optical recording and reproducing apparatus performing recording and/or reproducing of a signal to an optical recording medium, comprising the optical head performing recording and/or reproducing of the signal to the optical recording medium according to claim 4.

21. An optical recording and reproducing apparatus performing recording and/or reproducing of a signal to an optical recording medium, comprising the optical head performing recording and/or reproducing of the signal to the optical recording medium according to claim 5.

22. An optical recording and reproducing apparatus performing recording and/or reproducing of a signal to an optical recording medium, comprising the optical head performing recording and/or reproducing of the signal to the optical recording medium according to claim 6.

23. An optical recording and reproducing apparatus performing recording and/or reproducing of a signal to an optical recording medium, comprising the optical head performing recording and/or reproducing of the signal to the optical recording medium according to claim 7.

24. An optical recording and reproducing apparatus performing recording and/or reproducing of a signal to an optical recording medium, comprising the optical head performing recording and/or reproducing of the signal to the optical recording medium according to claim 8.

25. An optical recording and reproducing apparatus performing recording and/or reproducing of a signal to an optical recording medium, comprising the optical head performing recording and/or reproducing of the signal to the optical recording medium according to claim 9.

26. An optical recording and reproducing apparatus performing recording and/or reproducing of a signal to an optical recording medium, comprising the optical head performing recording and/or reproducing of the signal to the optical recording medium according to claim 10.

27. An optical recording and reproducing apparatus performing recording and/or reproducing of a signal to an optical recording medium, comprising the optical head performing recording and/or reproducing of the signal to the optical recording medium according to claim 11.

28. An optical recording and reproducing apparatus performing recording and/or reproducing of a signal to an optical recording medium, comprising the optical head performing recording and/or reproducing of the signal to the optical recording medium according to claim 12.

29. An optical recording and reproducing apparatus performing recording and/or reproducing of a signal to an optical recording medium, comprising the optical head performing recording and/or reproducing of the signal to the optical recording medium according to claim 13.

30. An optical recording and reproducing apparatus performing recording and/or reproducing of a signal to an optical recording medium, comprising the optical head performing recording and/or reproducing of the signal to the optical recording medium according to claim 14.

31. An optical recording and reproducing apparatus performing recording and/or reproducing of a signal to an optical recording medium, comprising the optical head performing recording and/or reproducing of the signal to the optical recording medium according to claim 15.

32. An optical recording and reproducing apparatus performing recording and/or reproducing of a signal to an optical recording medium, comprising the optical head performing recording and/or reproducing of the signal to the optical recording medium according to claim 16.

* * * * *